(12) United States Patent
Hwang

(10) Patent No.: US 11,760,336 B2
(45) Date of Patent: Sep. 19, 2023

(54) POWER TRANSMISSION APPARATUS OF HYBRID ELECTRIC VEHICLE

(71) Applicants: Hyundai Motor Company, Seoul (KR); Kia Corporation, Seoul (KR)

(72) Inventor: Seong Wook Hwang, Whasung-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/734,818

(22) Filed: May 2, 2022

(65) Prior Publication Data

US 2023/0202456 A1 Jun. 29, 2023

(30) Foreign Application Priority Data

Dec. 27, 2021 (KR) .................. 10-2021-0188084

(51) Int. Cl.
| | |
|---|---|
| *B60W 20/20* | (2016.01) |
| *B60K 6/365* | (2007.10) |
| *F16H 57/10* | (2006.01) |
| *B60W 10/08* | (2006.01) |
| *B60W 10/101* | (2012.01) |
| *B60W 10/02* | (2006.01) |
| *B60W 10/06* | (2006.01) |
| *B60K 6/48* | (2007.10) |

(52) U.S. Cl.
CPC ............. *B60W 20/20* (2013.01); *B60K 6/365* (2013.01); *B60K 6/48* (2013.01); *B60W 10/02* (2013.01); *B60W 10/06* (2013.01); *B60W 10/08* (2013.01); *B60W 10/101* (2013.01); *F16H 57/10* (2013.01)

(58) Field of Classification Search
CPC ............. B60K 6/365; F16H 2200/2007; F16H 2200/2035; F16H 3/663; F16H 2200/2005; F16H 2200/2023
See application file for complete search history.

(56) References Cited

U.S. PATENT DOCUMENTS

| | | | | |
|---|---|---|---|---|
| 7,086,977 | B2 * | 8/2006 | Supina | B60L 15/20 475/5 |
| 10,408,309 | B2 * | 9/2019 | Beck | F16H 3/663 |
| 10,543,740 | B2 * | 1/2020 | Oh | B60K 6/365 |
| 2015/0119178 | A1 * | 4/2015 | Lee | B60K 6/445 475/5 |
| 2020/0062102 | A1 * | 2/2020 | Kim | F16H 3/663 |
| 2020/0240494 | A1 * | 7/2020 | Dempel | B60K 6/547 |

* cited by examiner

*Primary Examiner* — Stacey A Fluhart
(74) *Attorney, Agent, or Firm* — MORGAN, LEWIS & BOCKIUS LLP

(57) ABSTRACT

A power transmission apparatus of a hybrid vehicle including an engine and a first motor-generator and a second motor-generator includes a compound planetary gear set engaged to a first motor shaft of the first motor-generator, and configured to receive an engine torque from the engine through a one-way clutch, to receive a motor torque of the first motor-generator, and to output an output torque as a combination of the engine torque and the motor torque through a drive gear, a motor shaft gear fixedly connected to a second motor shaft of the second motor-generator, and an output shaft disposed in parallel to and between an engine torque shaft connected to the engine and the second motor shaft connected to the second motor, and gear-meshed with the drive gear and the motor shaft gear respectively through a driven gear.

9 Claims, 7 Drawing Sheets

FIG. 2

| Mode | | Operation element | OWC | B1 | B2 | Remark |
|---|---|---|---|---|---|---|
| EV 1 | | MG2 | - | - | - | |
| EV 2 | | MG1, MG2 | - | - | ● | |
| HEV | E-CVT | Engine, MG2 | ● | - | - | Engine torque is partially input to MG1 to generate electricity |
| | PARALLEL 1 | Engine, MG2 | ● | ● | - | |
| | PARALLEL 2 | Engine, MG2 | ● | - | ● | Torque assist of MG2 |

POWER TRANSMISSION APPARATUS OF HYBRID ELECTRIC VEHICLE

CROSS-REFERENCE TO RELATED APPLICATION

The present application claims priority to Korean Patent Application No. 10-2021-0188084 filed on Dec. 27, 2021, the entire contents of which is incorporated herein for all purposes by this reference.

BACKGROUND OF THE PRESENT DISCLOSURE

Field of the Present Disclosure

The present disclosure relates to a power transmission apparatus of a hybrid vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Because the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor-generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor.

Furthermore, the hybrid electric vehicle can provide a significant improvement of fuel efficiency through an idle stop function of stopping the engine when the vehicle stops, and also through a regenerative braking, where a motor-generator is driven as a generator to generate electricity by a kinetic energy of the vehicle under a braking situation, such generated electricity is stored in a battery, and the stored electricity is reused in driving the vehicle.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a power transmission apparatus of a hybrid vehicle including an engine and a first motor-generator and a second motor-generator, including a compound planetary gear set engaged to a first motor shaft of the first motor-generator, and configured to receive an engine torque from the engine through a one-way clutch, to receive a motor torque of the first motor-generator, and to output an output torque as a combination of the engine torque and the motor torque through a drive gear, a motor shaft gear fixedly connected to a second motor shaft of the second motor-generator, and an output shaft disposed in parallel to and between an engine torque shaft connected to the engine and the second motor shaft connected to the second motor, and gear-meshed with the drive gear and the motor shaft gear respectively through a driven gear.

The compound planetary gear set may include a common planet carrier configured to rotatably support both of a first planetary gear and a second planetary gear having different diameters, the common planet carrier including a planet carrier shaft connected to the engine torque shaft through the one-way clutch, a first sun gear gear-meshed with the first planetary gear and fixedly connected to the first motor shaft, and configured to selectively act as a fixed element, a second sun gear gear-engaged to the second planetary gear, and configured to selectively act as a fixed element, and a ring gear gear-meshed the first planetary gear, and fixedly connected to the drive gear.

The first planetary gear and the second planetary gear may be integrally formed to have a same rotation speed, and the first planetary gear may have a diameter greater than the second planetary gear.

The first sun gear may be selectively connectable to a transmission housing through a first brake. The second sun gear may be selectively connectable to the transmission housing through a second brake.

The output shaft may be gear-meshed with a final reduction gear of a differential through an output gear.

A power transmission apparatus of a hybrid vehicle according to an exemplary embodiment enables shifting of the engine speed to an increased speed for a high speed or medium speed driving, improving fuel efficiency.

Furthermore, a one-way clutch is disposed between the engine torque shaft and the planet carrier shaft of the compound planetary gear set, and thereby, in two EV modes, torques of the first motor-generator and the second motor-generator may not affect the engine without employing a separate clutch.

Furthermore, in the compound planetary gear set, torques of the engine and the first motor-generator are combined by first and second planetary gears and having different diameters sharing a common planet carrier and first and second sun gears externally gear-meshed with the planetary gears, and thereby two EV modes and two HEV PARALLEL modes, increasing shift ratio span.

Furthermore, electricity may be generated by supplying some of the torque of the engine to the first motor-generator in the HEV E-CVT mode, and thereby energy regeneration efficiency may be enhanced.

Furthermore, in two HEV PARALLEL modes, a sufficient driving torque may be achieved by the torque assistance of the second motor-generator, for example, on a sloped road.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is an operation chart of a power transmission apparatus of a hybrid vehicle according to an exemplary embodiment of the present disclosure.

Figure 1:
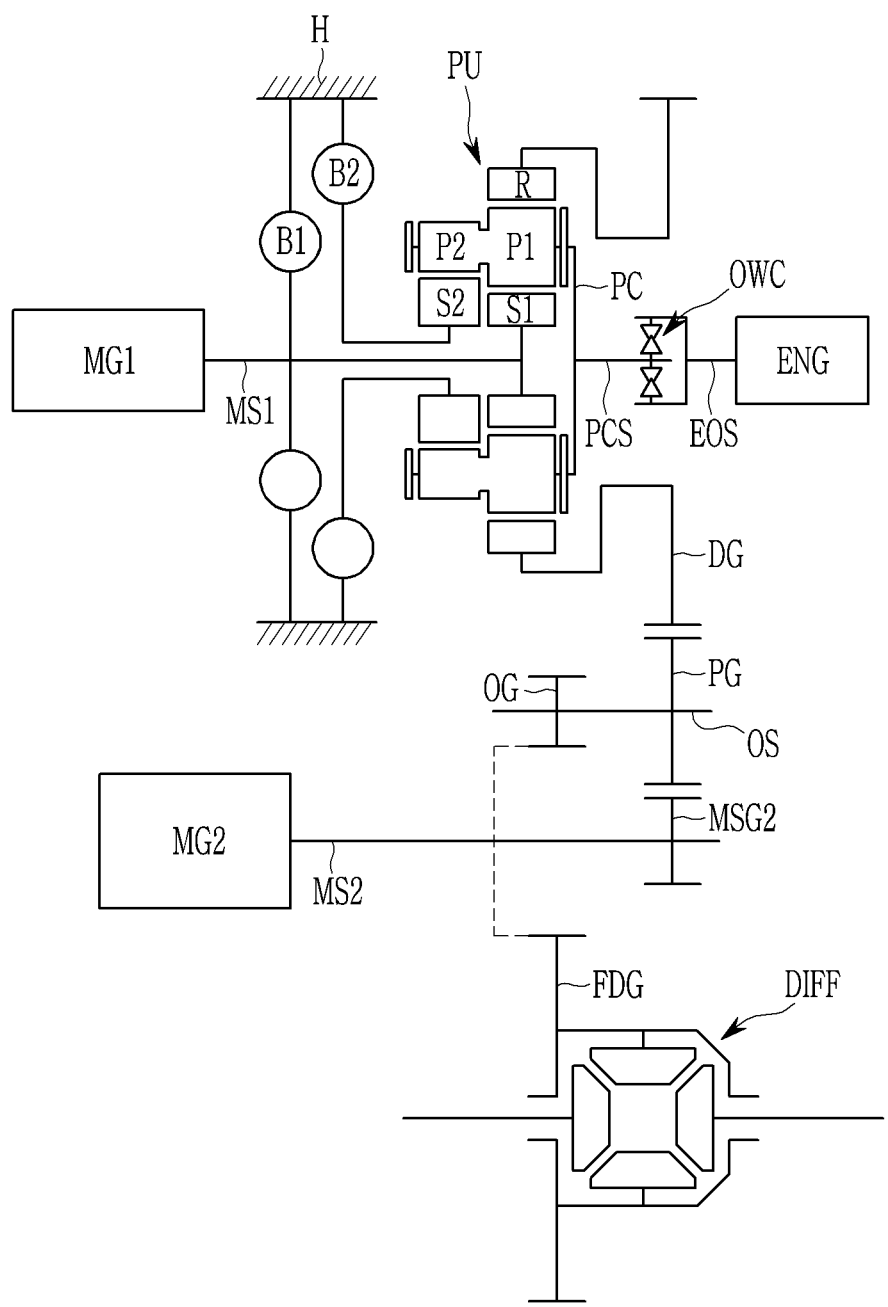
FIG. 1 is a schematic diagram of a power transmission apparatus of a hybrid vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

To clarify the present disclosure, portions that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

FIG. 1 is a schematic diagram of a power transmission apparatus of a hybrid vehicle according to an exemplary embodiment of the present disclosure.

Referring to FIG. 1, a power transmission apparatus of a hybrid vehicle according to an exemplary embodiment of the present disclosure is coupled to power sources of an engine ENG and first and second motor-generators MG1 and MG2.

A power transmission apparatus of a hybrid vehicle includes a compound planetary gear set PU configured to combine the torque of the engine ENG and the torque of the first motor-generator MG1, a motor shaft gear MSG2, and an output shaft OS configured to receive torques from the planetary gear set PU and the second motor-generator MG2 and to output an output torque to a differential DIFF.

The engine ENG is a power source, and may be implemented as one of various types such as a gasoline engine or a diesel engine.

The first and second motor-generators MG1 and MG2 are also power sources, and may function as a motor as a generator, respectively. Each of the first and second motor-generators MG1 and MG2 includes a stator fixed to a transmission housing H and a rotor rotatably supported at a radially internal side of the stator.

The engine ENG outputs an engine torque through an engine torque shaft EOS, and the engine torque shaft EOS is disposed on a same axis with a first motor shaft MS1 of the first motor-generator MG1.

The compound planetary gear set PU is disposed on the first motor shaft MS1 of the first motor-generator MG1.

In the compound planetary gear set PU, first and second planetary gears P1 and P2 are carried by a common planet carrier PC, and a planet carrier shaft PCS formed at a rotation center portion of the planet carrier PC is connected to the engine torque shaft EOS through a one-way clutch OWC.

Here, the first planetary gear and the second planetary gear P1 and P2 are formed with different diameters but integrally formed to rotate at a same rotation speed. At the instant time, the first planetary gear P1 may have a diameter greater than the second planetary gear P2.

Furthermore, the one-way clutch OWC is configured to transfer only the torque of the engine ENG to the compound planetary gear set PU, and not to transfer the torque of the compound planetary gear set PU to the engine ENG.

In the compound planetary gear set PU, a first sun gear S1 is externally gear-meshed with the first planetary gear P1, and a second sun gear S2 is externally gear-meshed with the second planetary gear P2.

Here, each of the first and second sun gears S1 and S2 may be selectively connectable to the transmission housing, to selectively act as a fixed element.

That is, the first sun gear S1 may be selectively connectable to the transmission housing H through a first brake B1, and the second sun gear S2 may be selectively connectable to the transmission housing H through a second brake B2.

Here, the first brake and the second brake B1 and B2 may be realized as multi-plate hydraulic pressure friction devices that are frictionally engaged by hydraulic pressure.

Furthermore, the first sun gear S1 is fixedly connected to the first motor shaft MS1.

The compound planetary gear set PU includes a single ring gear R, where the ring gear R is internally gear-meshed with the first planetary gear P1, and fixedly connected to a drive gear DG.

It may be understood that the planetary gear set PU receives torques through the sun gear S and the planet carrier PC and is configured to vary the received torque (by increasing or decreasing the speed) and to output the varied torque through the ring gear R.

Furthermore, the motor shaft gear MSG2 is fixedly connected to a second motor shaft MS2 of the second motor-generator MG2. Here, the second motor shaft MS2 is disposed in parallel with the first motor shaft MS1.

The output shaft OS is disposed in parallel to and between the engine torque shaft EOS and the second motor shaft MS2, and provided with a driven gear PG fixedly connected thereto, where the driven gear PG is externally gear-meshed with the drive gear DG and the motor shaft gear MSG2, respectively.

Furthermore, the output shaft OS is also provided with an output gear OG which is fixed thereto and externally gear-meshed with a final reduction gear FDG of the differential DIFF.

That is, the output shaft OS receives torques from the compound planetary gear set PU and the second motor-generator MG2 through the driven gear PG, and outputs the received torque to the differential DIFF through the output gear OG.

Gear ratios between the drive gear DG, the driven gear PG, and the motor shaft gear MSG2 may be appropriately set according to desired feature of the transmission.

FIG. 2 is an operation chart of a power transmission apparatus of a hybrid vehicle according to an exemplary embodiment of the present disclosure. FIG. 3, FIG. 3, FIG. 4, FIG. 5, FIG. 6, and FIG. 7 illustrate power flow in shifting modes of a power transmission apparatus of a hybrid vehicle according to an exemplary embodiment of the present disclosure, respectively.

Referring to FIG. 2 and FIG. 3, FIG. 3, FIG. 4, FIG. 5, FIG. 6, and FIG. 7, according to operations of the engine ENG and the first and second motor-generators MG1 and MG2 and an operation of the first brake and the second brake B1 and B2, five operation modes may be achieved as follows.

[EV1 Mode]

Figure 3:
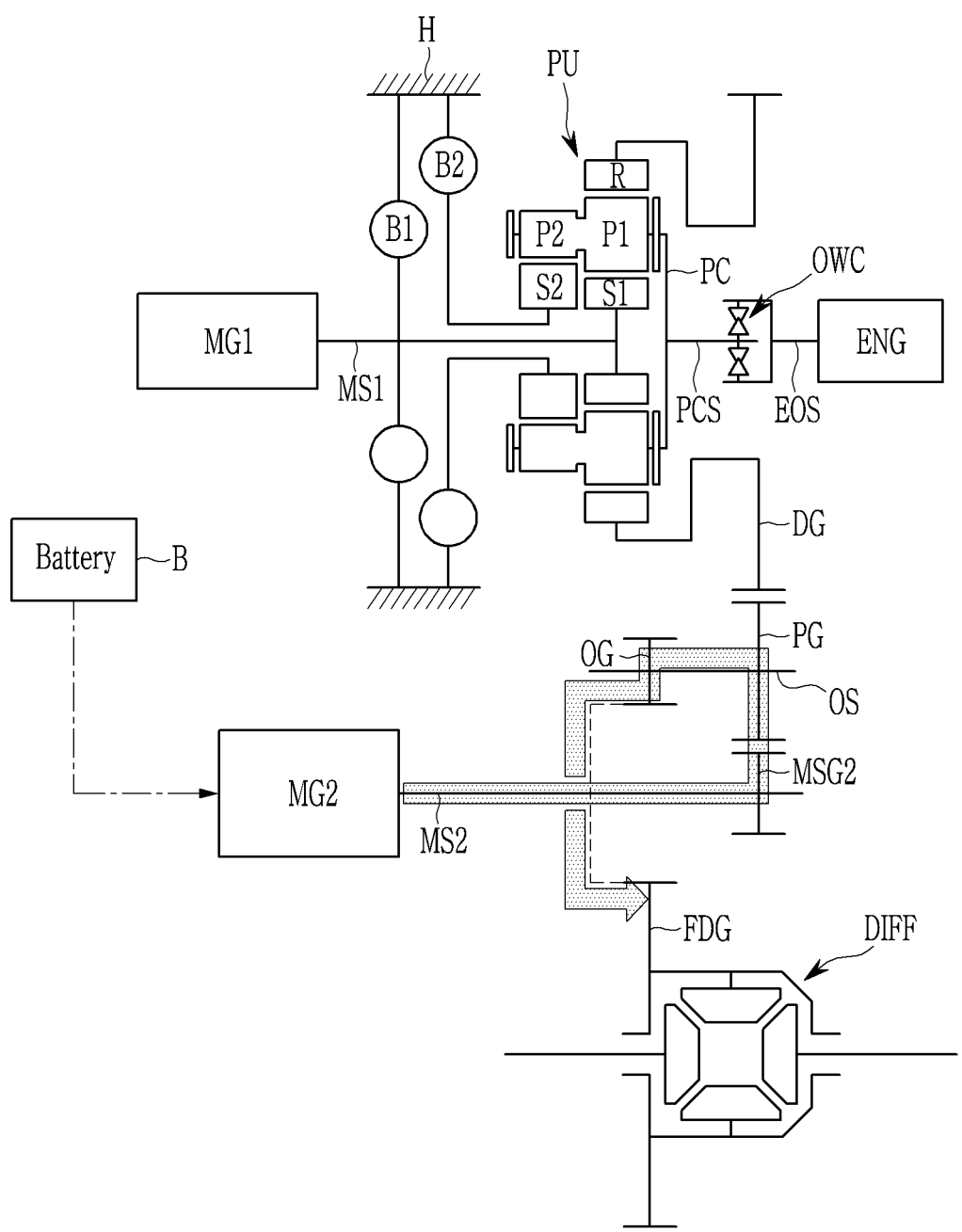
FIG. 3, FIG. 4, FIG. 5, FIG. 6, and FIG. 7 illustrate power flow in shifting modes of a power transmission apparatus of a hybrid vehicle according to an exemplary embodiment of the present disclosure, respectively.

Referring to FIG. 2 and FIG. 3, in the EV1 mode, while none of the first brake and the second brake B1 and B2 is operated, the operation of the engine ENG is stopped, and the second motor-generator MG2 is driven forward.

Accordingly, the second motor-generator MG2 is operated by electrical energy of a battery, and the torque of the second motor-generator MG2 is transferred to the differential DIFF through the second motor shaft MS2, the motor shaft gear MSG2, the driven gear PG, the output shaft OS, the output gear OG, and the final reduction gear FDG, realizing the EV1 mode.

For example, the EV1 mode may be achieved in a low speed driving below 30 km/h.

Furthermore, driving rearward may be enabled when the second motor-generator MG2 is driven backward in the above condition.

[EV2 Mode]

Figure 4:
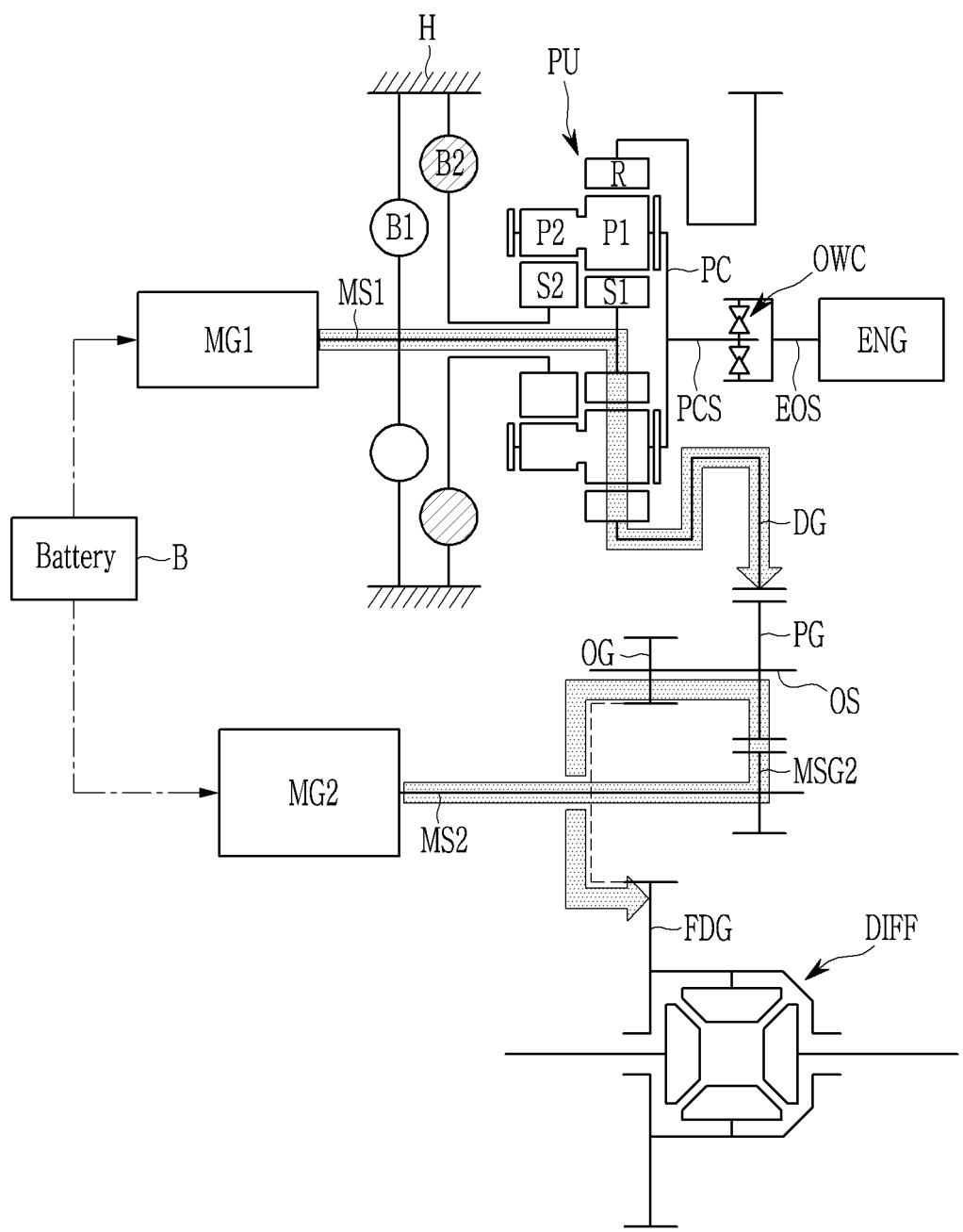

Referring to FIG. 2 and FIG. 4, in the EV2 mode, while only the second brake B2 is operated, the operation of the engine ENG is stopped, the first motor-generator MG1 is driven backward, and the second motor-generator MG2 is driven forward.

Accordingly, in the compound planetary gear set PU, the second sun gear S2 acts as a fixed element. Accordingly, the torque of the first motor-generator MG1 is input to the first sun gear S1 of the compound planetary gear set PU through the first motor shaft MS1 and increased in speed, and the increased speed is output through the drive gear DG connected to the ring gear R.

Furthermore, the torque of the first motor-generator MG1 output to the drive gear DG is combined with torque of the second motor-generator MG2 at the driven gear PG, and transferred to the differential DIFF through the output shaft OS, the output gear OG, and the final reduction gear FDG, realizing the EV2 mode.

For example, such EV2 mode may be realized in a high load situation such as a sloped road.

Furthermore, driving rearward may be enabled when the first motor-generator MG1 is driven forward and the second motor-generator MG2 is driven backward in the above condition.

[HEV E-CVT Mode]

Figure 5:
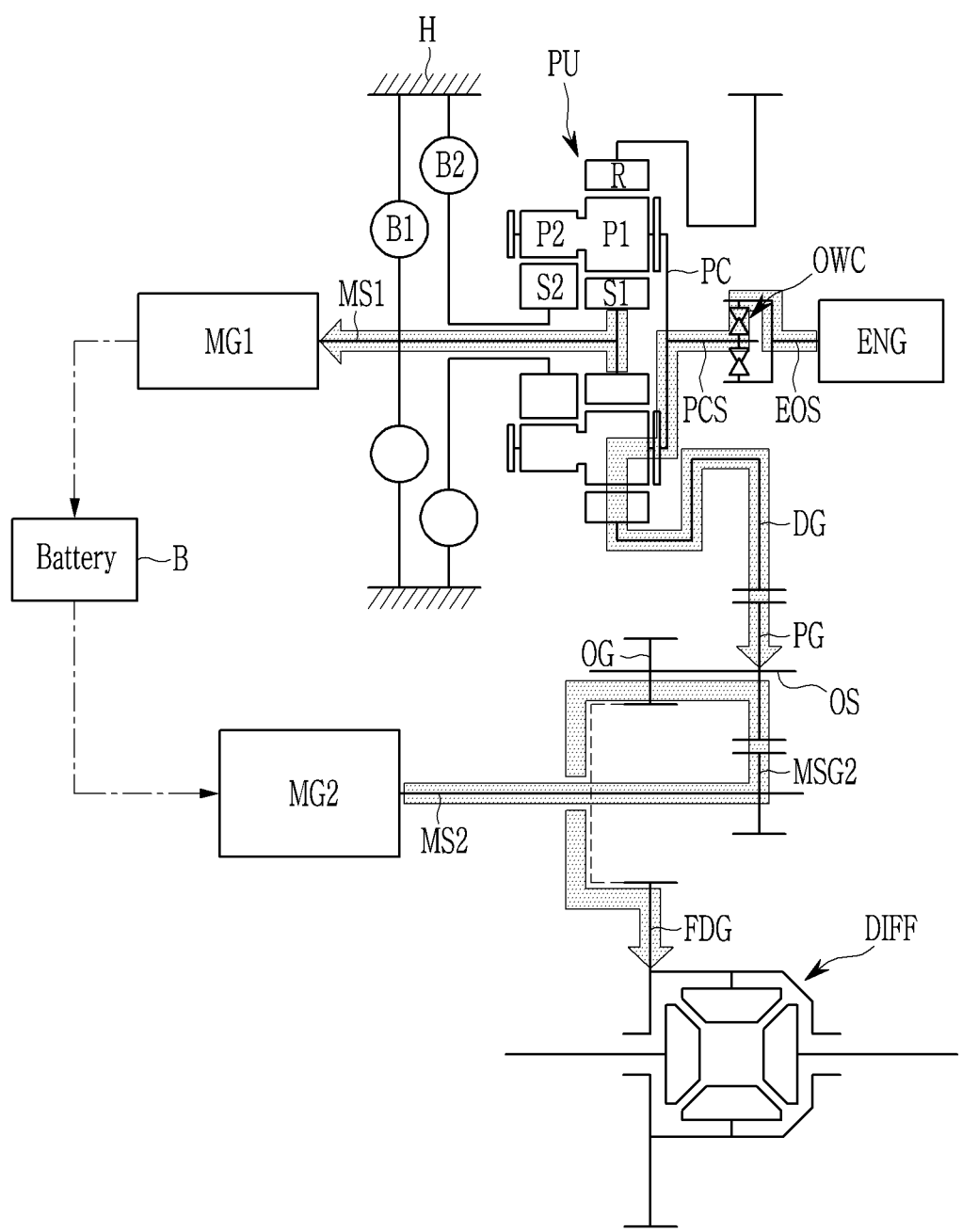

Referring to FIG. 2 and FIG. 5, in REV E-CVT mode, in a neutral state where none of the first brake and the second brake B1 and B2 is operated, the one-way clutch OWC functions, the engine ENG is operated, and the second motor-generator MG2 is driven forward.

Accordingly, the torque of the engine ENG is input to the planet carrier PC of the compound planetary gear set PU through the engine torque shaft EOS. Accordingly, some of engine torque is provided to the first motor shaft MS1 of the first motor-generator MG1 through the first sun gear S, and the other of the engine torque is output to the drive gear DG connected to the ring gear R.

Accordingly, the first motor-generator MG1 may be driven to generate electricity to recharge the battery by the partial torque of the engine ENG.

Furthermore, the torque of the engine ENG output to the drive gear DG is combined with torque of the second motor-generator MG2 at the driven gear PG, and transferred to the differential DIFF through the output shaft OS, the output gear OG, and the final reduction gear FDG, realizing the HEV E-CVT mode.

[HEV PARALLEL 1 Mode]

Figure 6:
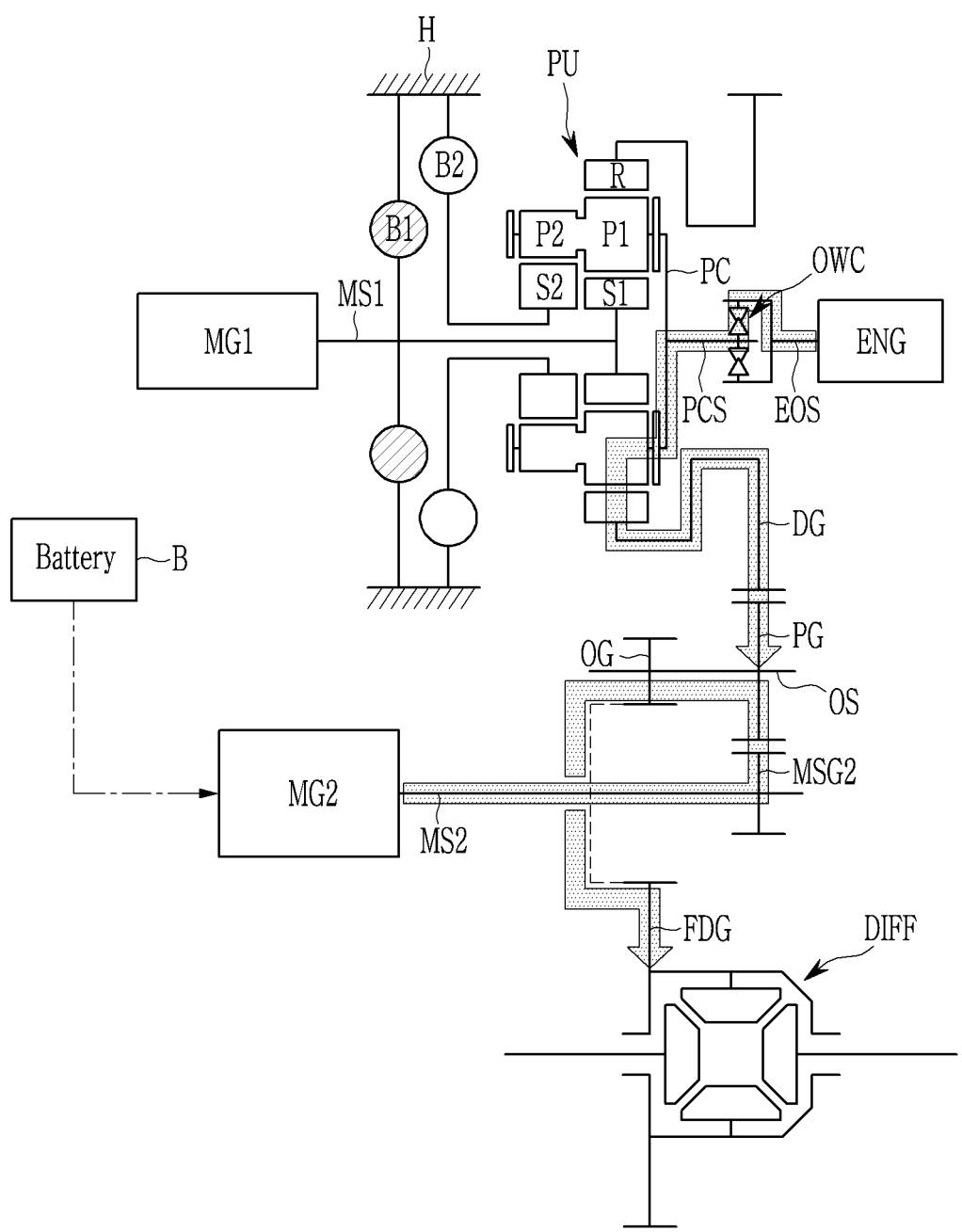

Referring to FIG. 2 and FIG. 6, in the HEV PARALLEL 1 mode, the one-way clutch OWC and the first brake B1 are operated, the engine ENG is operated, and the second motor-generator MG2 is driven forward.

Accordingly, in the compound planetary gear set PU, the first sun gear S1 acts as a fixed element. Accordingly, the torque of the engine ENG is input to the planet carrier PC of the compound planetary gear set PU through the engine torque shaft EOS and increased in speed, and the increased speed is output through the drive gear DG connected to the ring gear R.

Furthermore, the torque of the engine ENG output to the drive gear DG is combined with the torque of the second motor-generator MG2 at the driven gear PG when the second motor-generator MG2 is operated, and transferred to the differential DIFF through the output shaft OS, the output gear OG, and the final reduction gear FDG, realizing the HEV PARALLEL 1 mode.

At the present time, the operation of the second motor-generator MG2 may be an operation for torque assistance of the engine ENG.

[HEV PARALLEL 2 Mode]

Figure 7:
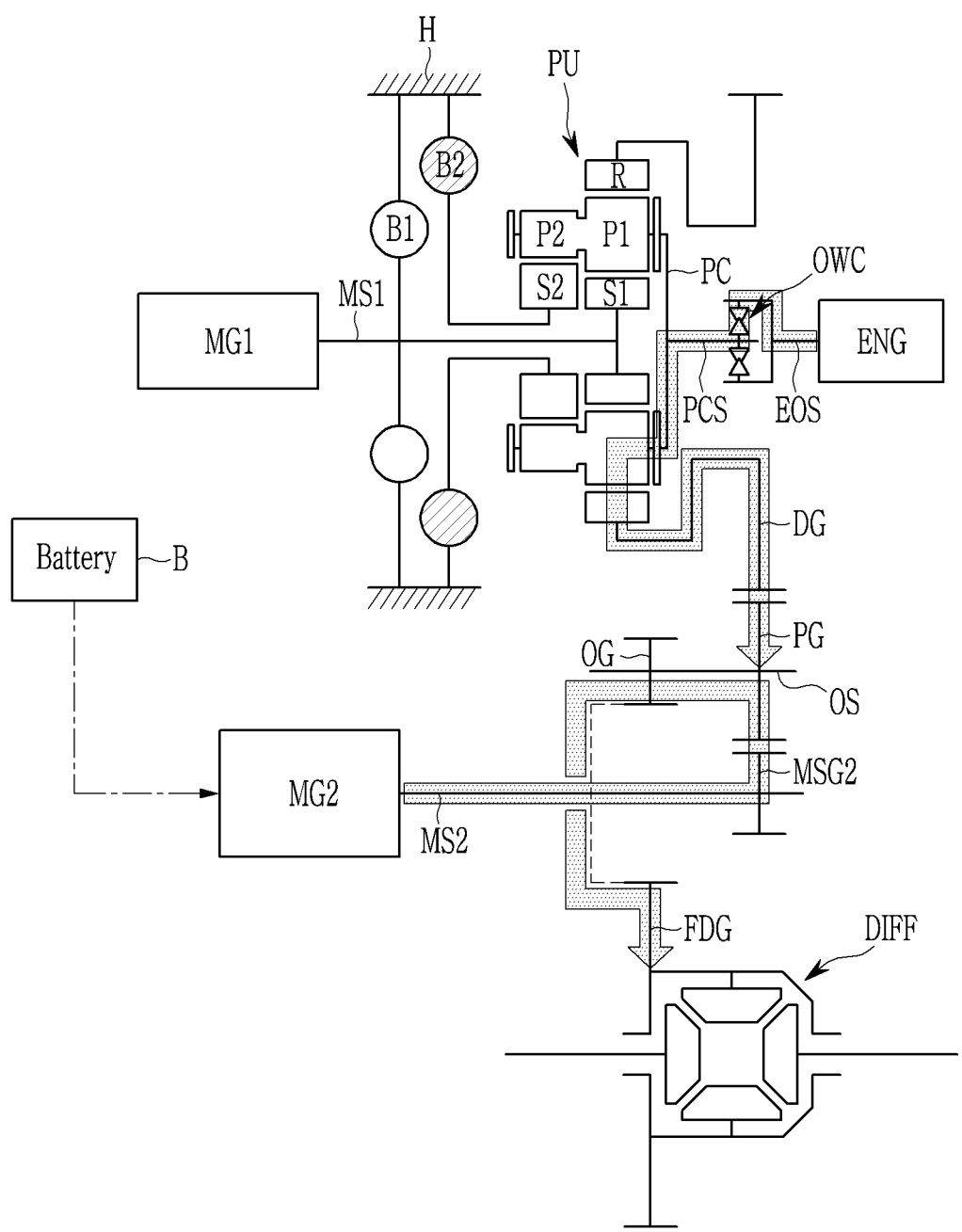

Referring to FIG. 2 and FIG. 7, in the HEV PARALLEL 2 mode, the one-way clutch OWC and the second brake B2 are operated, the engine ENG is operated, and the second motor-generator MG2 is driven forward.

Accordingly, in the compound planetary gear set PU, the second sun gear S2 acts as a fixed element. Accordingly, the torque of the engine ENG is input to the planet carrier PC of the compound planetary gear set PU through the engine torque shaft EOS and increased in speed to a higher rotation speed compared to the HEV PARALLEL 1 mode, and the increased speed is output through the drive gear DG connected to the ring gear R.

Furthermore, the torque of the engine ENG output to the drive gear DG is combined with the torque of the second motor-generator MG2 at the driven gear PG when the second motor-generator MG2 is operated, and transferred to the differential DIFF through the output shaft OS, the output gear OG, and the final reduction gear FDG, realizing the HEV PARALLEL 2 mode.

At the present time, the operation of the second motor-generator MG2 may be an operation for torque assistance of the engine ENG.

As described above, a power transmission apparatus of a hybrid vehicle according to an exemplary embodiment enables shifting of the engine speed to an increased speed for a high speed or medium speed driving, improving fuel efficiency.

Furthermore, a one-way clutch is disposed between the engine torque shaft EOS and the planet carrier shaft PCS of the compound planetary gear set PU, and accordingly, in two EV modes, torques of the first and second motor-generators MG1 and MG2 may not affect the engine ENG without employing a separate clutch.

Furthermore, in the compound planetary gear set PU, torques of the engine ENG and the first motor-generator MG1 are combined by first and second planetary gears P1 and P2 having different diameters sharing a common planet carrier PC and first and second sun gears S1 and S2 externally gear-meshed with the planetary gears P1 and P2, and thereby two EV modes and two HEV PARALLEL modes, increasing shift ratio span.

Furthermore, electricity may be generated by supplying some of the torque of the engine ENG to the first motor-generator MG1 in the HEV E-CVT mode, and thereby energy regeneration efficiency may be enhanced.

Furthermore, in two HEV PARALLEL modes, a sufficient driving torque may be achieved by the torque assistance of the second motor-generator MG2, for example, on a sloped road.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power transmission apparatus of a hybrid vehicle including an engine and a first motor-generator and a second motor-generator, the power transmission apparatus comprising:
    a compound planetary gear set engaged to a first motor shaft of the first motor-generator, and configured to receive an engine torque from the engine through a one-way clutch, to receive a motor torque of the first motor-generator, and to output an output torque as a combination of the engine torque and the motor torque through a drive gear;
    a motor shaft gear fixedly connected to a second motor shaft of the second motor-generator; and
    an output shaft disposed in parallel to and between an engine torque shaft connected to the engine and the second motor shaft connected to the second motor, and gear-meshed with the drive gear and the motor shaft gear respectively through a driven gear,
    wherein the compound planetary gear set includes:
    a first planetary gear and a second planetary gear having different diameters,
    a common planet carrier configured to rotatably support the first planetary gear and the second planetary gear and including a planet carrier shaft coupled to the engine torque shaft through the one-way clutch;
    a first sun gear gear-meshed with the first planetary gear and fixedly connected to the first motor shaft, and configured to selectively act as a first fixed element;
    a second sun gear gear-engaged to the second planetary gear, and configured to selectively act as a second fixed element; and
    a ring gear gear-meshed with the first planetary gear, and fixedly connected to the drive gear.

2. The power transmission of claim 1, wherein the first planetary gear and the second planetary gear are integrally formed to have a same rotation speed.

3. The power transmission of claim 1, wherein the first planetary gear has a diameter greater than a diameter of the second planetary gear.

4. The power transmission of claim 1, further including:
    a first brake and a second brake,
    wherein the first sun gear is selectively connectable to a transmission housing through the first brake, and
    wherein the second sun gear is selectively connectable to the transmission housing through the second brake.

5. The power transmission of claim 4, wherein the first brake is mounted to the first motor shaft and the transmission housing.

6. The power transmission of claim 4, wherein the second brake is mounted to the second sun gear and the transmission housing.

7. The power transmission of claim 4,
    wherein, in an EV1 mode, while none of the first brake and the second brake is operated, operation of the engine is stopped, and the second motor-generator is driven forward,
    in an EV2 mode, while only the second brake is operated, the operation of the engine is stopped, the first motor-generator is driven backward, and the second motor-generator is driven forward, in an HEV E-CVT mode, in a neutral state where none of the first brake and the second brake is operated, the one-way clutch functions, the engine is operated, and the second motor-generator is driven forward, in an HEV PARALLEL 1 mode, the one-way clutch and the first brake are operated, the engine is operated, and the second motor-generator is driven forward, and in an HEV PARALLEL 2 mode, the one-way clutch and the second brake are operated, the engine is operated, and the second motor-generator is driven forward.

8. The power transmission of claim 1, wherein the second sun gear is rotatably mounted on the first motor shaft.

9. The power transmission of claim 1, wherein the output shaft fixed to the driven gear is gear-meshed with a final reduction gear of a differential through an output gear.

* * * * *